US009619412B2

(12) United States Patent
Shanbhogue et al.

(10) Patent No.: US 9,619,412 B2
(45) Date of Patent: *Apr. 11, 2017

(54) ENABLING VIRTUALIZATION OF A PROCESSOR RESOURCE

(71) Applicant: Intel Corporation, Santa Clara, CA (US)

(72) Inventors: Vedvyas Shanbhogue, Austin, TX (US); Stephen J. Robinson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,351

(22) Filed: Aug. 14, 2015

(65) Prior Publication Data

US 2015/0347168 A1 Dec. 3, 2015

Related U.S. Application Data

(63) Continuation of application No. 14/331,398, filed on Jul. 15, 2014, now Pat. No. 9,141,570, which is a continuation of application No. 13/626,441, filed on Sep. 25, 2012, now Pat. No. 8,806,104.

(51) Int. Cl.
| | | |
|---|---|---|
| *G06F 13/24* | (2006.01) | |
| *G06F 9/30* | (2006.01) | |
| *G06F 9/455* | (2006.01) | |
| *G06F 12/10* | (2016.01) | |
| *G06F 12/14* | (2006.01) | |
| *G06F 12/1027* | (2016.01) | |

(52) U.S. Cl.
CPC .......... *G06F 13/24* (2013.01); *G06F 9/30101* (2013.01); *G06F 9/45533* (2013.01); *G06F 12/10* (2013.01); *G06F 12/145* (2013.01); *G06F 12/1441* (2013.01); *G06F 12/1027* (2013.01); *G06F 2212/1016* (2013.01); *G06F 2212/152* (2013.01); *G06F 2212/206* (2013.01)

(58) Field of Classification Search
None
See application file for complete search history.

(56) References Cited

U.S. PATENT DOCUMENTS

| | | |
|---|---|---|
| 7,424,709 B2 | 9/2008 | Neiger et al. |
| 7,769,938 B2 | 8/2010 | Kaushik |
| 8,244,945 B2 | 8/2012 | Shanbhogue et al. |
| 2007/0157197 A1 | 7/2007 | Neiger et al. |
| 2010/0191885 A1 | 7/2010 | Serebrin et al. |
| 2011/0161541 A1 | 6/2011 | Madukkarumukumana et al. |
| 2011/0197004 A1 | 8/2011 | Serebrin et al. |

OTHER PUBLICATIONS

International Searching Authority, "Notification of Transmittal of the International Search Report and the Written Opinion of the International Searching Authority," mailed Nov. 29, 2013, in International application No. PCT/US2013/048793.

*Primary Examiner* — Kevin Verbrugge
(74) *Attorney, Agent, or Firm* — Trop, Pruner & Hu, P.C.

(57) ABSTRACT

In one embodiment, a processor includes an access logic to determine whether an access request from a virtual machine is to a device access page associated with a device of the processor and if so, to re-map the access request to a virtual device page in a system memory associated with the VM, based at least in part on information stored in a control register of the processor. Other embodiments are described and claimed.

20 Claims, 8 Drawing Sheets

ENABLING VIRTUALIZATION OF A PROCESSOR RESOURCE

This application is a continuation of U.S. patent application Ser. No. 14/331,398, filed Jul. 15, 2014, which is a continuation of U.S. patent application Ser. No. 13/626,441, filed Sep. 25, 2012, now U.S. Pat. No. 8,806,104, issued Aug. 12, 2014, the content of which is hereby incorporated by reference.

BACKGROUND

A conventional virtual machine monitor (VMM) executes on a computing system and presents to other software the abstraction of one or more virtual machines (VMs). Each virtual machine may function as a self-contained platform, running its own guest operating system (OS) hosted by the VMM and other software, collectively referred to as guest software. The guest software expects to operate as if it were running on a dedicated computer rather than a virtual machine. That is, the guest software expects to control various events and have access to hardware resources. The hardware resources may include processor resident resources, resources that reside in memory and resources that reside on the underlying hardware platform. The events may include interrupts, exceptions, platform events, execution of certain instructions, and so forth.

In a virtual machine environment, the VMM should be able to have ultimate control over these events and hardware resources to provide proper operation of guest software running on the virtual machines and for protection from and between guest software running on the virtual machines. To achieve this, the VMM typically receives control when guest software accesses a protected resource or when other events (such as interrupts or exceptions) occur. For example, when an operation in a virtual machine supported by the VMM causes a system device to generate an interrupt, the currently running virtual machine is interrupted and control of the processor is passed to the VMM. The VMM then receives the interrupt, and handles the interrupt itself or delivers the interrupt to the appropriate virtual machine. However, this switching between guest and VMM is an inefficient use of processor cycles.

DETAILED DESCRIPTION

Figure 1:
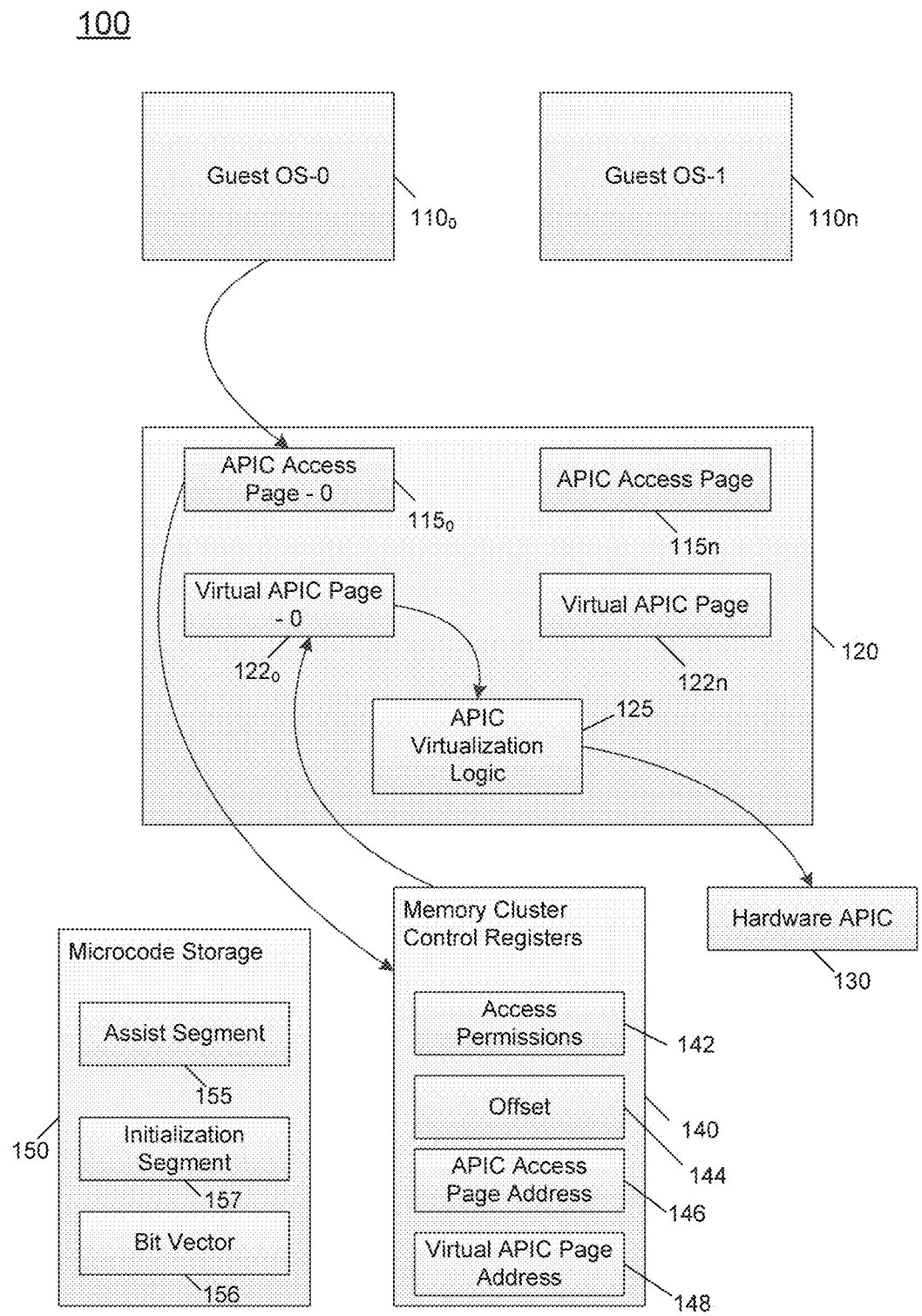
FIG. 1 is a block diagram of a portion of a system in accordance with an embodiment of the present invention.

In various embodiments, one or more resources of a processor such as a multicore processor can be virtualized using control structures and logic as described herein. More specifically, embodiments are directed to virtualization of a memory mapped processor resource such as an advanced programmable interrupt controller (APIC). In general, an APIC is a hardware resource of a processor such as a microcontroller or logic to receive incoming interrupts from various agents, both internal and external to the processor and to prioritize and select an appropriate resource for handling the interrupt, such as one or more cores of the processor.

Using embodiments of the present invention, this APIC may be virtualized such that multiple virtual agents e.g., individual guests executing on the processor, can access the APIC in a time sliced manner.

As will be described further below, to effect APIC virtualization, multiple addresses may be stored into a control structure for a virtual machine, referred to herein as a virtual machine control structure (VMCS), which may be provided for each virtual machine running on a processor and which can be stored in a system memory. Namely, these addresses may include a physical access page address and a virtual access page address. The physical access page address is the physical address to which the guest OS performs input/output (JO) operations. In the example of virtualizing the APIC, this is the address to which the guest performs memory mapped IO operations. The virtual access page address is the address of a page in memory where the state of the virtualized device is stored. In the example of virtualizing an APIC this page stores the state of the virtual APIC. Specifically, the physical access page may correspond to an APIC access page and the virtual access page may correspond to a virtual APIC page, in the example of virtualizing an APIC. However, more generally these addresses may be for a device access page and a virtual device page. Guest accesses to valid locations within this APIC access page may be emulated by remapping such accesses to the virtual APIC page. In this way, a write access stores data to the corresponding offset within the virtual APIC page, and in turn a load access returns data from the corresponding offset in the virtual APIC page to the requester. Accesses to invalid locations within the APIC access page can lead to an exit from a virtual machine so that a virtual machine monitor or other supervisor software can handle the condition.

To effect such operation efficiently, embodiments may provide for combined hardware controlled and microcode controlled mechanisms of the processor. More specifically, this microcode may be invoked in certain cases when an access to an APIC access page is detected. In general, this microcode may verify that various attributes of the access is valid and if so, re-start instruction execution after programming of hardware to remap the APIC access page to an offset within the virtual APIC page for efficient access upon a next access to the APIC access page.

In addition, embodiments further provide hardware that can be used in place of the microcode assist to maintain correct operation even with a lack of instruction inclusion in an instruction cache, where incorrect operation may occur due to fetching of an instruction from an instruction cache that has been changed since the remapping. Embodiments may thus combine virtualization hardware and microcode assist mechanisms to ensure correct operation even without a guarantee of instruction inclusion in an instruction cache.

In various embodiments, access logic within a memory cluster of a processor may provide for matching of a programmable offset on the APIC access page using information from a control register in accordance with an embodiment of the present invention. When a guest is entered (e.g., via a VMLAUNCH or VMRESUME instruction), the microcode may program a first address field in a page address field of this control register (e.g., an EMULATED_REG_OFFSET field) with an offset to a predetermined offset value (e.g., 0x80H) within the APIC access page. In addition, as a default the control register may be programmed to provide for both emulation of read and write accesses via first and second permission indicators stored in permission fields (e.g., EMULATE_READ and EMULATE_ WRITE fields). On a VM entry, the APIC access page address and the vAPIC page address are read out of the VMCS and written into these control registers.

Then upon detection of an access to the APIC access page, the address of this access request may be remapped to a corresponding offset in a vAPIC page, e.g., corresponding to the address stored in the control register (namely the vAPIC page address, which may be originally obtained from the VMCS upon entry into the guest).

The memory cluster then verifies the permissions of the access against those programmed in the control register, as follows: if the access is a load and bits 11:0 of the access address match an EMULATED_REG_OFFSET value within the control register and the EMULATE_READ indicator is programmed to be set (e.g., a logic 1), the access is allowed; and if the access is a store and bits 11:0 of the access address match the EMULATES_REG_OFFSET value and the EMULATE_WRITE indicator is programmed 1 the access is allowed. When the access is allowed the memory cluster remaps the address of the load or store such that it is performed to the virtual APIC page.

If these conditions are not met (access is not to an offset programmed by microcode, access is a load and EMULATE_READ is 0, or access is a store and EMULATE_WRITE is 0), hardware may invoke a microcode assist. The hardware also provides details of the access, e.g., offset, size, and type (read/write), to the microcode assist.

In this microcode assist, the offset, size and type (load or store) of the access may be evaluated to determine if the access is to a valid location. If so, the microcode may program appropriate values (e.g., as to the permissions and the APIC access page offset) into the control register and restart the instruction.

If the restarted instruction is the same as the one that originally caused the assist, the access will now match in the memory cluster and will be emulated and redirected to the vAPIC page. Any subsequent instructions that match this offset of a type allowed for emulation will continue to be emulated and remapped without a microcode assist. This behavior allows the remaps to happen in hardware without a microcode assist for the most commonly accessed offsets.

Referring now to FIG. 1, shown is a block diagram of a portion of a system in accordance with an embodiment of the present invention. The portion of the system shown in FIG. 1 details the interaction between various layers of software and hardware. Specifically, one or more guest operating systems (OS) may operate within a corresponding virtual machine $110_0$-$110_n$ (generically VM or guest 110). Of course, additional software may execute within each VM, such as various guest software, e.g., one or more user-level applications.

Relevant to the discussion here, a guest OS executing in a guest $110_0$ can issue an access request, ostensibly to a memory structure. However, due to virtualization, instead of communicating directly with underlying hardware such as a hardware APIC 130, the access instead may be made to an APIC access page $115_0$, which is a valid physical address within a virtual machine monitor (VMM) 120 that is mapped into the guest address space. This access page may be a page in physical memory associated with a given guest. Note that there may be an APIC access page provided per guest.

This access to APIC access page 115 may in turn lead to an access to a virtual APIC (vAPIC) page $122_0$ within system memory used by VMM 120. That is, depending upon an offset to which the access is directed within this page, an access logic 125 of the VMM (also referred to herein as APIC virtualization logic) can determine whether to allow this access to flow to the underlying hardware APIC 130, which may be a memory mapped hardware structure of the processor.

To enable such access to occur, first it can be determined whether the access from the guest is allowed. To this end, additional hardware, namely a control register 140 (that can be implemented as one or more control registers of a memory cluster of a processor), may be provided to store information regarding access permissions, address information and so forth for a particular guest that is executing. In the embodiment shown, control register 140 may include an access permission storage 142. In various embodiments, this storage may include one or more fields to store indicators to indicate whether particular types of accesses are allowed to an APIC access page. In one embodiment, this permission storage can include a read permission indicator and a write permission indicator. In addition, an offset storage 144 may be present. The offset storage may store an offset to a location within an APIC access page to emulate. A vAPIC storage 146 also may be provided. This storage may be used to store a base address of the vAPIC page for the corresponding guest. In addition to a vAPIC storage may be provided. This storage may be used to store a base address of the vAPIC page to which the emulated access is to be redirected.

Thus before an access within a virtualized environment to hardware APIC 130 is permitted, it can be determined whether the access is allowed based at least in part on information stored in control register 140. In addition as will be described further below, the processor may include a microcode storage 150 that includes various microcode to be executed by underlying hardware of the processor. As part of this microcode, an assist microcode segment 155 may be provided that can be used to assist in emulation operations with regard to the APIC flow as described herein. Also for use in emulation operations, access can be made to a bit vector 156 within the microcode storage, details of which are described further below. The microcode may also include an initialization segment 157 to perform initialization operations for the processor, including programming default values for the control register and to perform further operations on entry into a VM. Also note that while the hardware device emulation in the embodiments described herein is for an APIC, understand the scope of the present invention is not limited in this regard and in other embodiments, other types of hardware devices can be emulated such as a network controller. Although shown at this high level in the embodiment of FIG. 1, understand the scope of the present invention is not limited in this regard.

Figure 2:
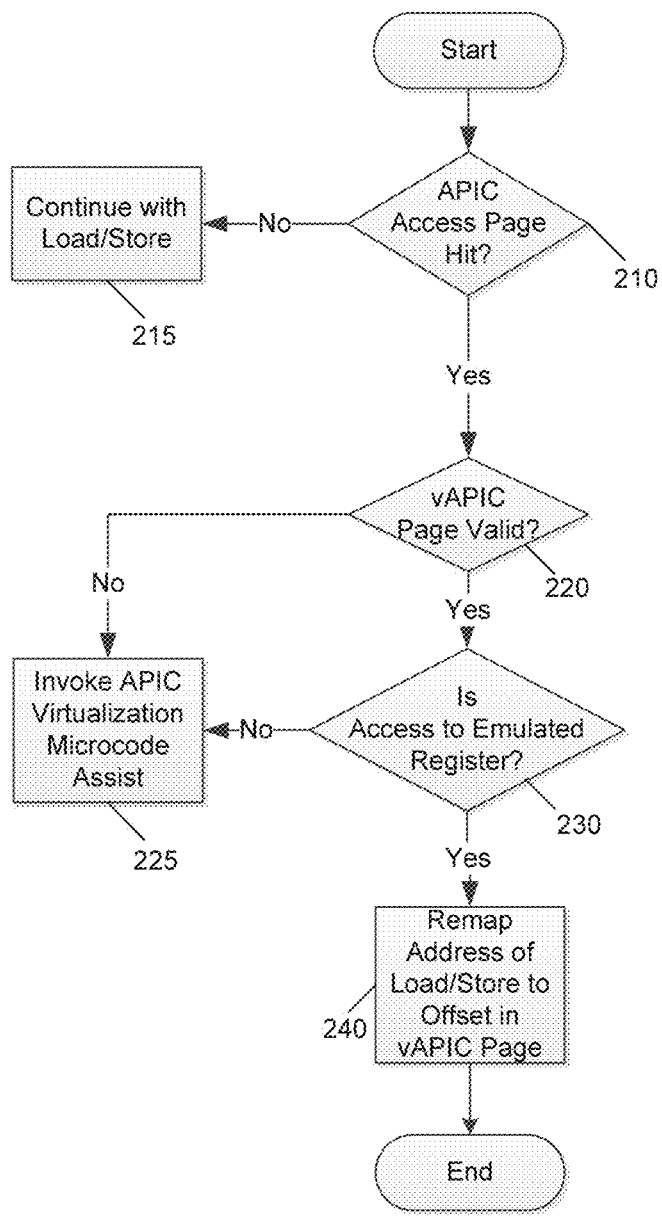
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 may be performed by logic within a memory cluster of a processor that can handle incoming memory requests and determine whether to allow access in accordance with an embodiment of the present invention. As shown in FIG. 2, method 200 may begin by determining whether an access request received in the memory cluster hits on an APIC access page.

As described above, the APIC access page may be a page in VMM physical address space that is mapped into the guest's physical address space. If the access is not for such a page, control passes to block 215 where conventional operations for handling an access, e.g., a load or store access, may be performed.

If instead it is determined that the access request hits an APIC access page, control passes to diamond 220 to determine whether the virtual APIC page corresponding to this APIC access page of the VM from which the access was performed is valid. In an embodiment, this determination may be based on a valid bit in a control register. As an example, control register 140 shown in FIG. 1 may include in addition to a vAPIC page address a valid bit to indicate whether the address stored in this portion of the control register is valid (which may also be stored in the control register). If so, control passes next to diamond 230 where it can be determined whether the access is to an emulated register. Although the scope of the present invention is not limited in this regard, this determination may be based on various constituent determinations. Specifically, in one embodiment these determinations may include: whether the access is for a data read or write (not an instruction fetch); access size is at most 32 bits; access is contained within low 4 bytes of a naturally aligned 16 byte region; bits 11:0 of the access address match EMULATED_REG_OFFSET (e.g., stored in offset field 144); access is a data read and EMULATED_READ is 1, or access is a data write and EMULATED_WRITE is 1 (e.g., both stored in access permission field 142).

Thus if the determination at diamond 230 is in positive that the access is to an emulated register, control passes to block 240 where an address of the access request, e.g., a load/store access operation may be remapped to an offset in the vAPIC page. As such, for a read operation, requested information may be read from the corresponding offset within the virtual APIC page and reported back to the guest. Or, if it is a store request, the corresponding data of the write request may be stored at the offset indicated in the vAPIC page, namely the offset in the vAPIC page corresponding to the offset in the APIC access page, in other words, the offset specified by bits 11:0 of the access.

Still referring to FIG. 2 from both diamond 220 and diamond 230 if the determinations of either of these points are in the negative, control passes to block 225 where an APIC virtualization microcode assist may be invoked. Further details of this assist are described further below.

Figure 3:
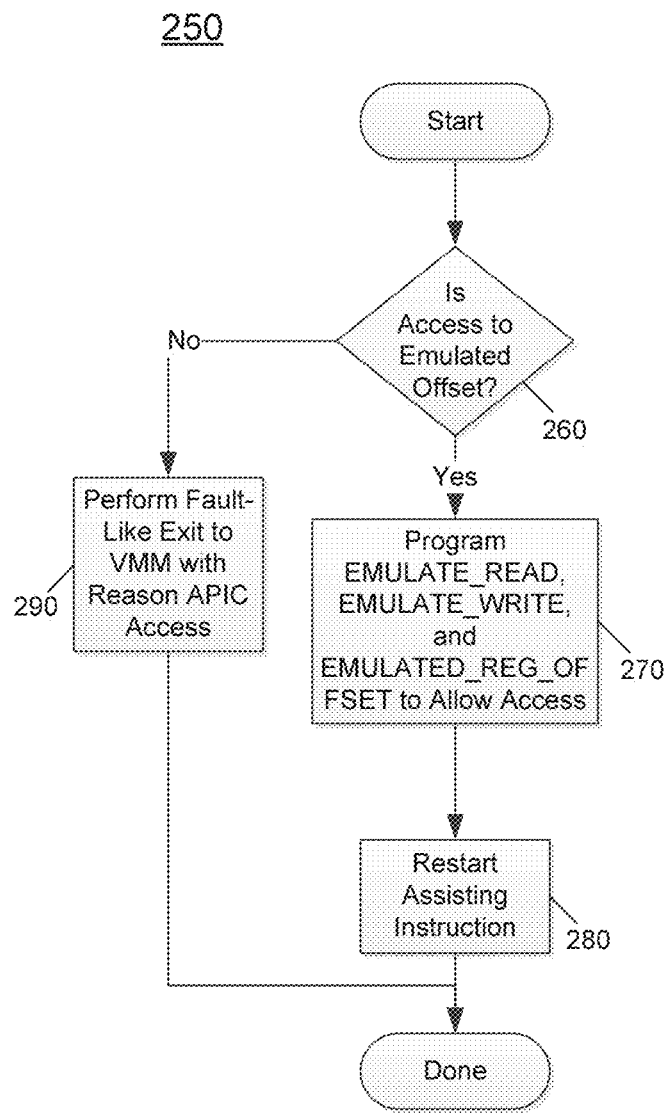
FIG. 3 is a flow diagram of a method for performing APIC virtualization microcode operations in accordance with an embodiment of the present invention.

Referring now to FIG. 3, shown is a flow diagram of a method for performing APIC virtualization microcode operations in accordance with an embodiment of the present invention. As seen in FIG. 3, method 250 may begin by determining whether the requested access is to an emulated offset. This determination, as with all other operations shown in FIG. 3, may be performed by microcode. More specifically, a given processor may include a microcode segment, referred to herein as a microcode assist segment that includes microcode for execution on hardware of the processor to efficiently perform the illustrated operations. In an embodiment, this determination of access to an emulated offset may be based on a bit vector for valid locations within an APIC access page. In one embodiment, this bit vector may be stored in a non-volatile storage, e.g., as part of a processor's microcode. In another embodiment, this bit vector may be provided by the VMM through the VMCS and stored in a processor control register for subsequent use by this microcode. Although the scope of the present invention is not limited in this regard, in one embodiment a plurality of valid offsets may be provided for read emulation and a plurality of valid offsets may be provided for write emulation. In one particular embodiment, approximately 40 valid offsets may be provided for read emulation and approximately 20 valid offsets provided for write emulations, although the scope of the present invention is not limited in this regard.

If the access is not to one of these emulated offsets, e.g., as determined based on a bit vector, control passes to block 290 where an exit may be performed from a virtual machine environment to the VMM. More specifically, a VM exit may occur to thus pass control to the VMM with an indication that the fault is due to an APIC access failure. Responsive to such an indication, the VMM may take appropriate action such as terminating the guest or performing emulated device specific actions like logging an error or so forth.

Still referring to FIG. 3, if instead the access is to a valid emulated offset, control passes to block 270 where various information may be programmed to allow an access to an virtual APIC page to occur (as described above with regard to the memory cluster logic). In one embodiment, this programming may be of the control register described above. More specifically, this control register may be programmed with permissions regarding emulated reads and writes as well as an emulated register offset to thus indicate that an access to this emulated offset is to be allowed.

Control next passes to block 280 where the assisting instruction may be restarted. More specifically, the microcode may issue an instruction to a front end unit of the processor to cause the access request instruction (e.g., a load/store) to be re-fetched and re-executed. Note that it is possible that this instruction may still be present in a caching structure of the processor, such as an instruction cache. If so, the instruction can be obtained with minimal latency and passed for execution. Otherwise if the instruction has been evicted for any of various reasons such as a capacity eviction, the instruction may again be fetched from a memory hierarchy. In any event, method 250 concludes and control passes back to further operations for this access instruction. For example, the operations of FIG. 2 may again be performed for the re-fetched instruction. However at this time (assuming the same instruction is obtained) the determinations at both diamonds 220 and 230 should be in the affirmative and thus a remapping may be performed at block 240. Although shown at this high level in the embodiment of FIG. 3, understand the scope of the present invention is not limited in this regard.

Figure 4:
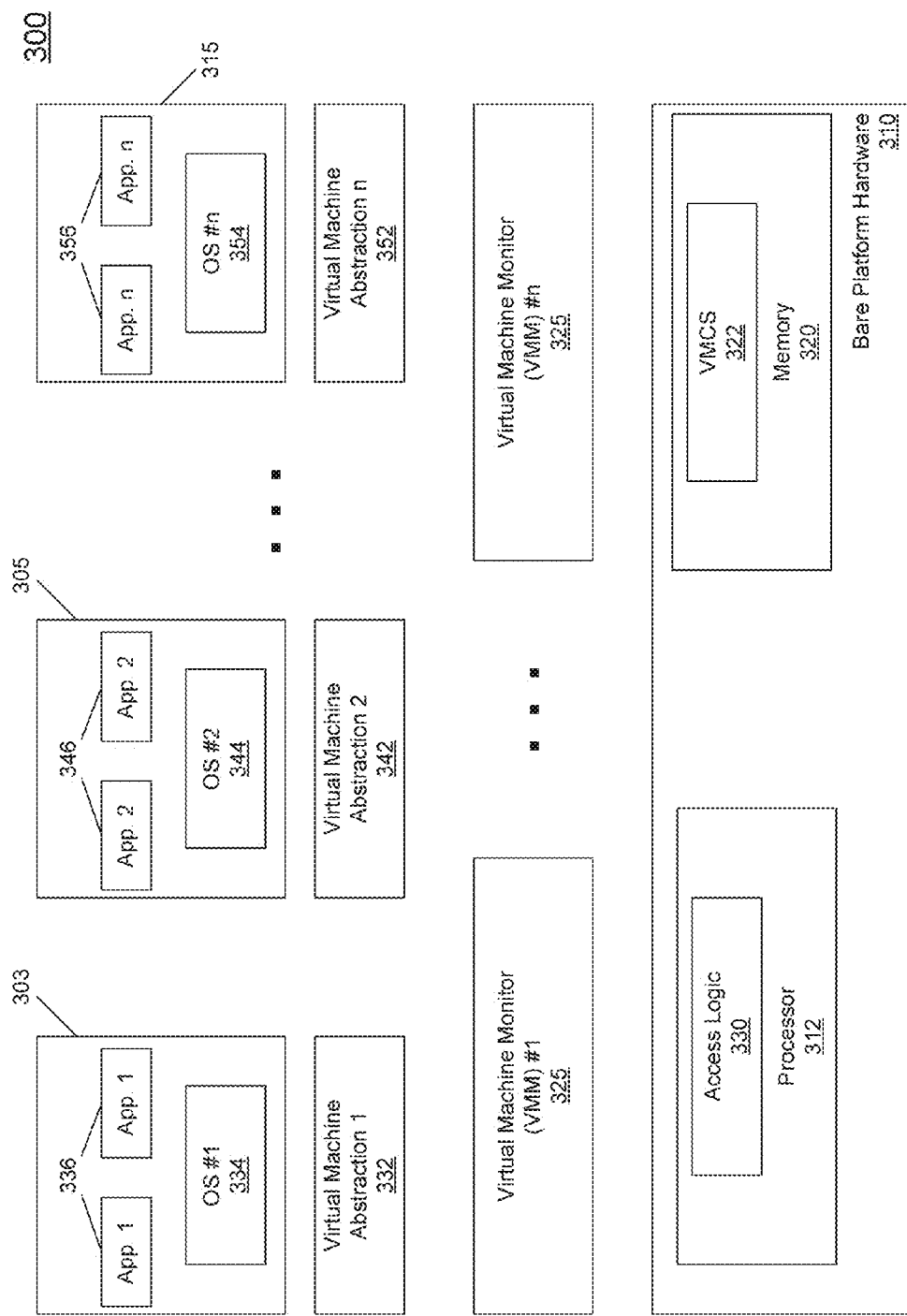
FIG. 4 is a block diagram of one embodiment of a virtual machine environment in accordance with an embodiment of the present invention.

FIG. 4 illustrates one embodiment of a virtual machine environment 300. In this embodiment, bare platform hardware 310 is a computing platform, such as a given server, desktop, laptop, Ultrabook™, tablet, smartphone or so forth to execute an OS or VMM, such as VMMs 325. The platform hardware 310 includes at least one processor 312, memory 320 and possibly other platform hardware (e.g. input output devices), not shown.

Processor 312 can be any type of processor capable of executing software, such as a microprocessor, digital signal processor, microcontroller, or the like. The processor 312 may include microcode, programmable logic or hardcoded logic for performing virtualization of processor components according to embodiments of the present invention. To this end, access logic 330 may be present to control access to a virtualized resource such as an APIC (not shown for ease of illustration).

Memory 320 can be a hard disk, random access memory (RAM), read only memory (ROM), flash memory, or other non-volatile storage, or any combination of the above devices, or any other type of non-transitory machine readable storage medium readable by processor 312. Memory 320 may store instructions or data for performing the execution of method embodiments of the present invention. As seen memory 320 includes one or more VMCSs 322 that include addresses for one or more device access pages, and corresponding virtual device pages, as described herein.

Each VMM 325, though typically implemented in software, may emulate and export a bare machine interface to higher level software. Such higher level software may be a standard or real-time OS. The VMMs 325 may be implemented, for example, in hardware, software, firmware, or by a combination of various techniques.

When running, each VMM 325 presents to guest software (software other than that of the VMMs 325) the abstraction of one or more VMs. The VMMs 325 may provide the same or different abstractions to the various guests. The guest software running on each VM may include a guest OS (e.g., a guest OS 334, 344 or 354) and various guest software applications (e.g., applications 336, 346 and 356). Collectively, guest OS and software applications are referred to herein as guest software 303, 305 and 315.

Guest software 303, 305 and 315 expects to access physical resources (e.g., processor registers, memory and I/O devices) within the VMs 332, 342 and 352 on which the guest software is running. The VMMs 325 facilitate access to resources desired by guest software while retaining ultimate control over resources within the platform hardware 310. In addition, the guest software 303, 305 and 315 expect to handle various events such as exceptions, interrupts and platform events.

Figure 5:
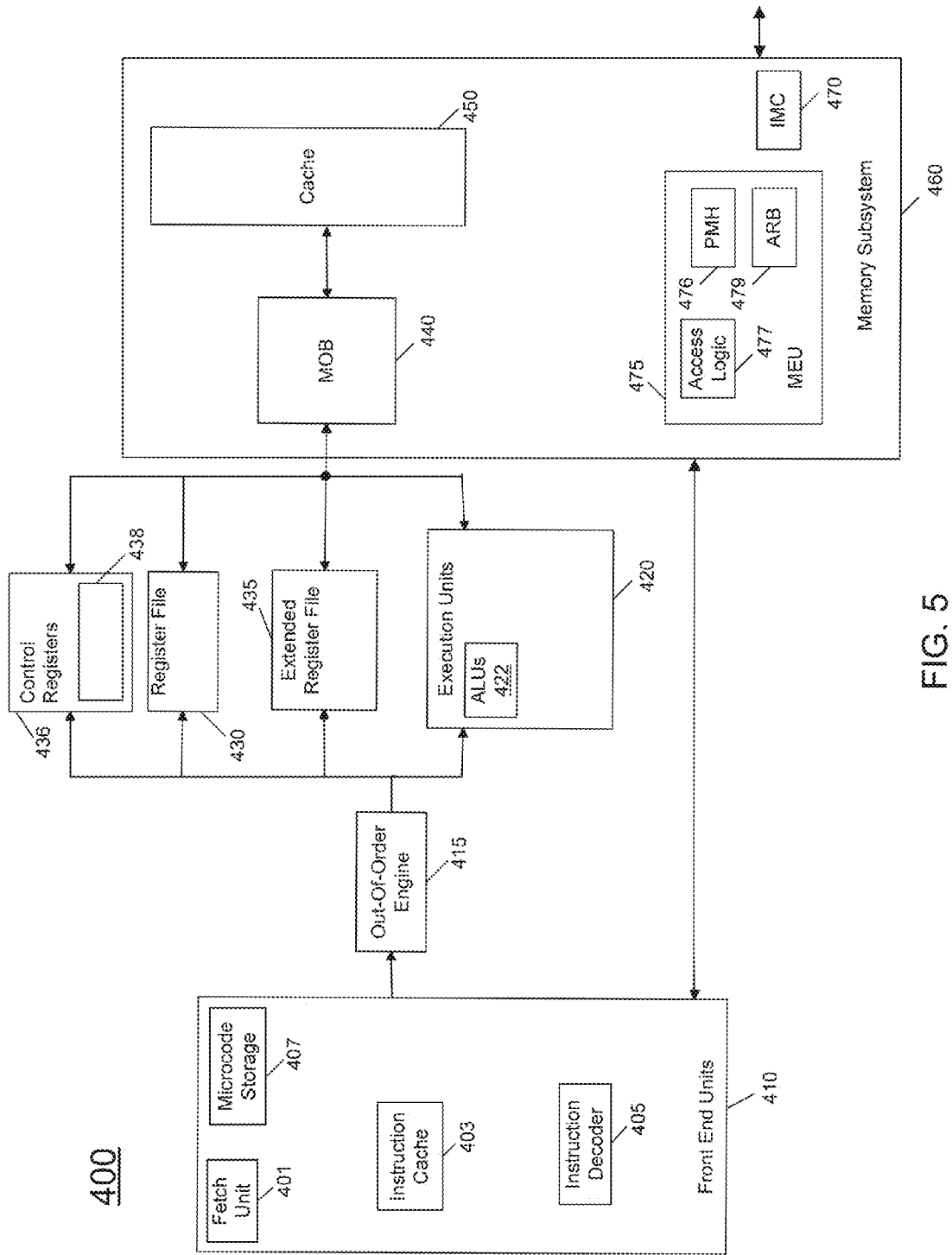
FIG. 5 is a block diagram of a processor core in accordance with one embodiment of the present invention.

Embodiments can be implemented in many different systems. For example, embodiments can be realized in a processor such as a multicore processor. Referring now to FIG. 5, shown is a block diagram of a processor core in accordance with one embodiment of the present invention. As shown in FIG. 5, processor core 400 may be one core of a multicore processor, and is shown as a multi-stage pipelined out-of-order processor. Processor core 400 is shown with a relatively simplified view in FIG. 5 to illustrate various features used in connection with virtualization of a processor resource in accordance with an embodiment of the present invention.

As shown in FIG. 5, core 400 includes front end units 410, which may be used to fetch instructions to be executed and prepare them for use later in the processor. For example, front end units 410 may include a fetch unit 401, an instruction cache 403, and an instruction decoder 405. In some embodiments, the instruction cache may maintain inclusiveness, keeping entries until a corresponding instruction is retired. In other embodiments, the instruction cache may be a non-inclusive cache such that an entry corresponding to a pending instruction in the core may be evicted prior to retirement of the instruction. In some implementations, front end units 410 may further include a trace cache, along with microcode storage as well as a micro-operation storage. Fetch unit 401 may fetch macro-instructions, e.g., from memory or instruction cache 403, and feed them to instruction decoder 405 to decode them into primitives, i.e., micro-operations for execution by the processor. Also present may be a microcode storage 407 to store assist code in accordance with an embodiment of the present invention.

Coupled between front end units 410 and execution units 420 is an out-of-order (OOO) engine 415 that may be used to receive the micro-instructions and prepare them for execution. More specifically OOO engine 415 may include various buffers to re-order micro-instruction flow and allocate various resources needed for execution, as well as to provide renaming of logical registers onto storage locations within various register files such as register file 430 and extended register file 435 such as by using renaming logic of the engine. Register file 430 may include separate register files for integer and floating point operations. Extended register file 435 may provide storage for vector-sized units, e.g., 256 or 512 bits per register. A set of control registers 436 may be present, including a register 438 to store information associated with programmable virtualization of a processor resource such as an APIC, as described herein.

Various resources may be present in execution units 420, including, for example, various integer, floating point, and single instruction multiple data (SIMD) logic units, among other specialized hardware. For example, such execution units may include one or more arithmetic logic units (ALUs) 422. Of course other execution units such as multiply-accumulate units and so forth may further be present. Results may be provided to a retirement logic, which may be implemented within a memory subsystem 460 of the processor. Various processor structures including execution units and front end logic, for example, may be coupled to a memory subsystem 460. This memory subsystem may provide an interface between processor structures and further portions of a memory hierarchy, e.g., an on or off-chip cache and a system memory. As seen the subsystem has various components including a memory order buffer (MOB) 440. More specifically, MOB 440 may include various arrays and logic to receive information associated with instructions that are executed. This information is then examined by MOB 440 to determine whether the instructions can be validly retired and result data committed to the architectural state of the processor, or whether one or more exceptions occurred that prevent a proper retirement of the instructions. Of course, MOB 440 may handle other operations associated with retirement.

As shown in FIG. 5, MOB 440 is coupled to a cache 450 which, in one embodiment may be a low level cache (e.g., an L1 cache). Memory subsystem 460 also may include an integrated memory controller 470 to provide for communication with a system memory (not shown for ease of illustration in FIG. 5). Memory subsystem 460 may further include a memory execution unit 475 that handles various operations to initiate memory requests and handle return of data from memory. For example, as shown in the embodiment of FIG. 5, MEU 475 may include a page miss handler 476 to obtain translations from logical addresses to physical addresses when a translation lookaside buffer miss occurs. An access logic 477 of the MEU may perform access checks to determine whether an access request is to an emulated region, and if so, to re-map the request to a redirection region (e.g., an APIC access page-to-vAPIC page remapping). Also present may be an arbitrator 479 to arbitrate among various memory requests also may be present. Further, while not shown understand that other structures such as buffers, schedulers and so forth may be present in the MEU.

From memory subsystem 460, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of a so-called x86 instruction set architecture (ISA) architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 6:
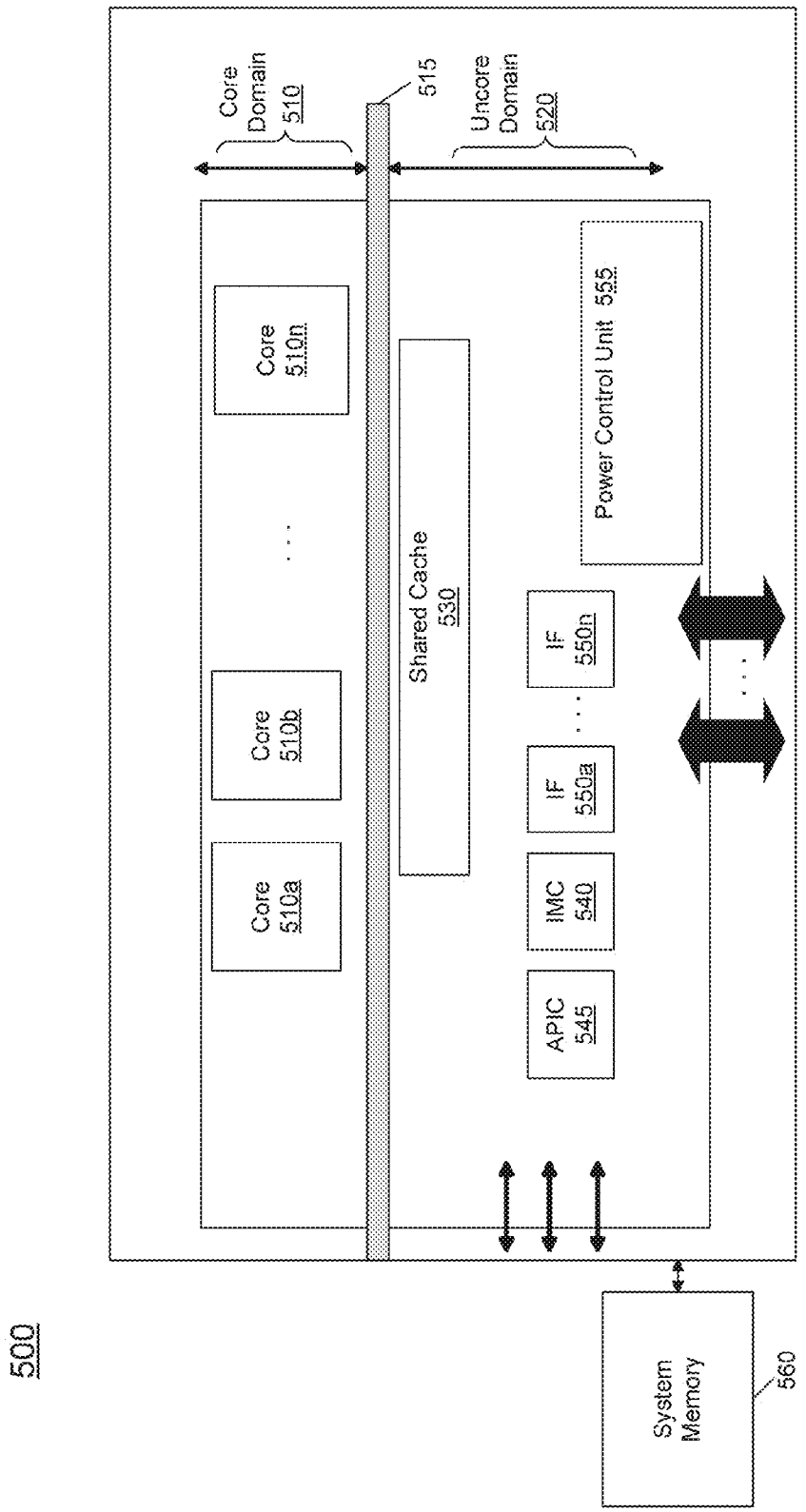
FIG. 6 is a block diagram of a processor in accordance with an embodiment of the present invention.

Referring now to FIG. 6, shown is a block diagram of a processor in accordance with an embodiment of the present invention. As shown in FIG. 6, processor 500 may be a multicore processor including a plurality of cores 510a-510n in a core domain 510. In one embodiment, each such core may be of an independent power domain and can be configured to operate at an independent voltage and/or frequency, and to enter turbo mode when available headroom exists, or the cores can be uniformly controlled as a single domain. The cores may be coupled via an interconnect 515 to a system agent or uncore 520 that includes various components. As seen, the uncore 520 may include a shared cache 530 which may be a last level cache. In addition, the uncore may include an integrated memory controller 540, various interfaces 550 and a power control unit 555 to control power consumption by the components of the processor. An APIC 545 may be virtualized among multiple VMs executing on the cores using access logic of memory clusters of the cores as described herein.

With further reference to FIG. 6, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 6, the scope of the present invention is not limited in this regard.

Figure 7:
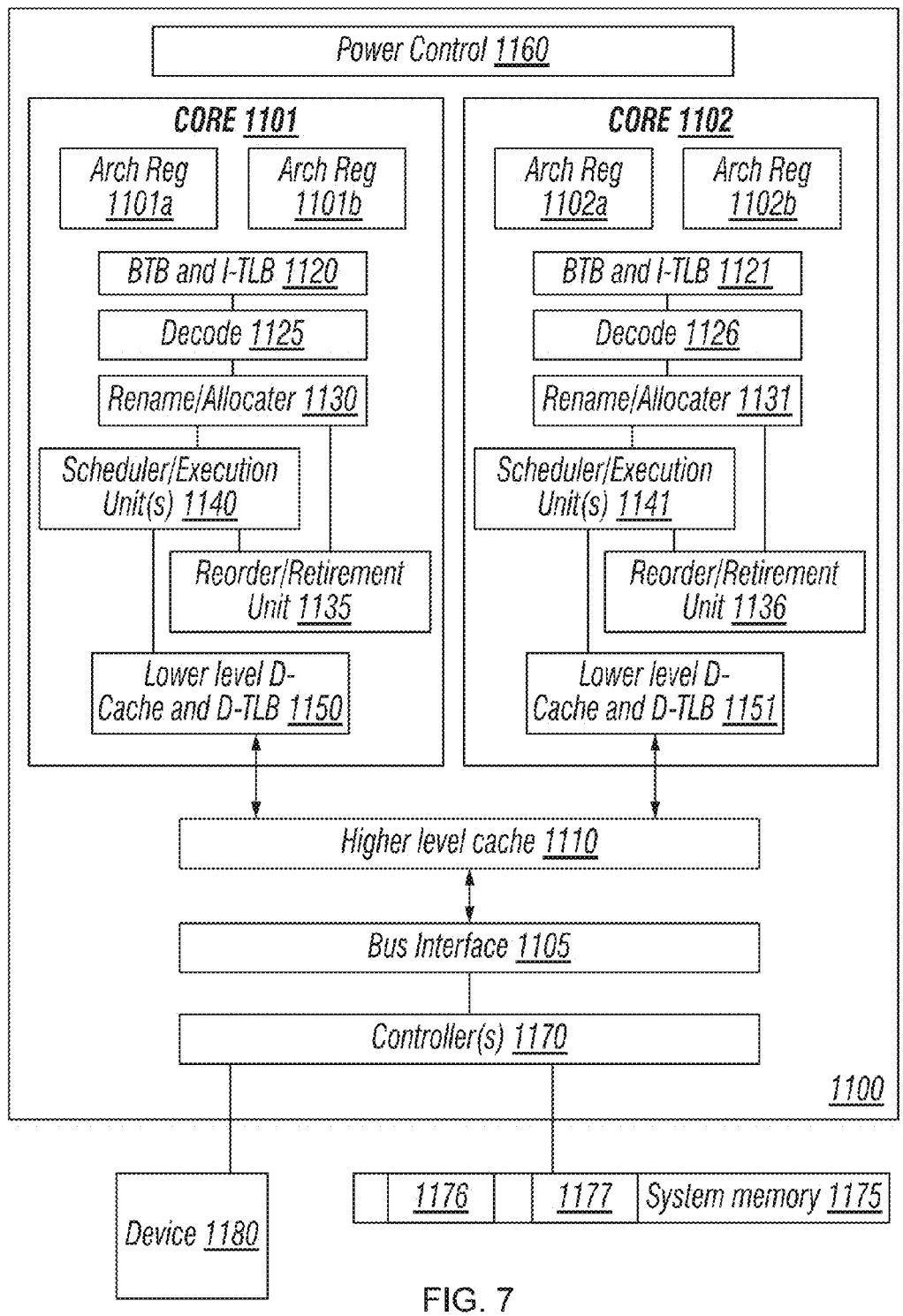
FIG. 7 is a block diagram of an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
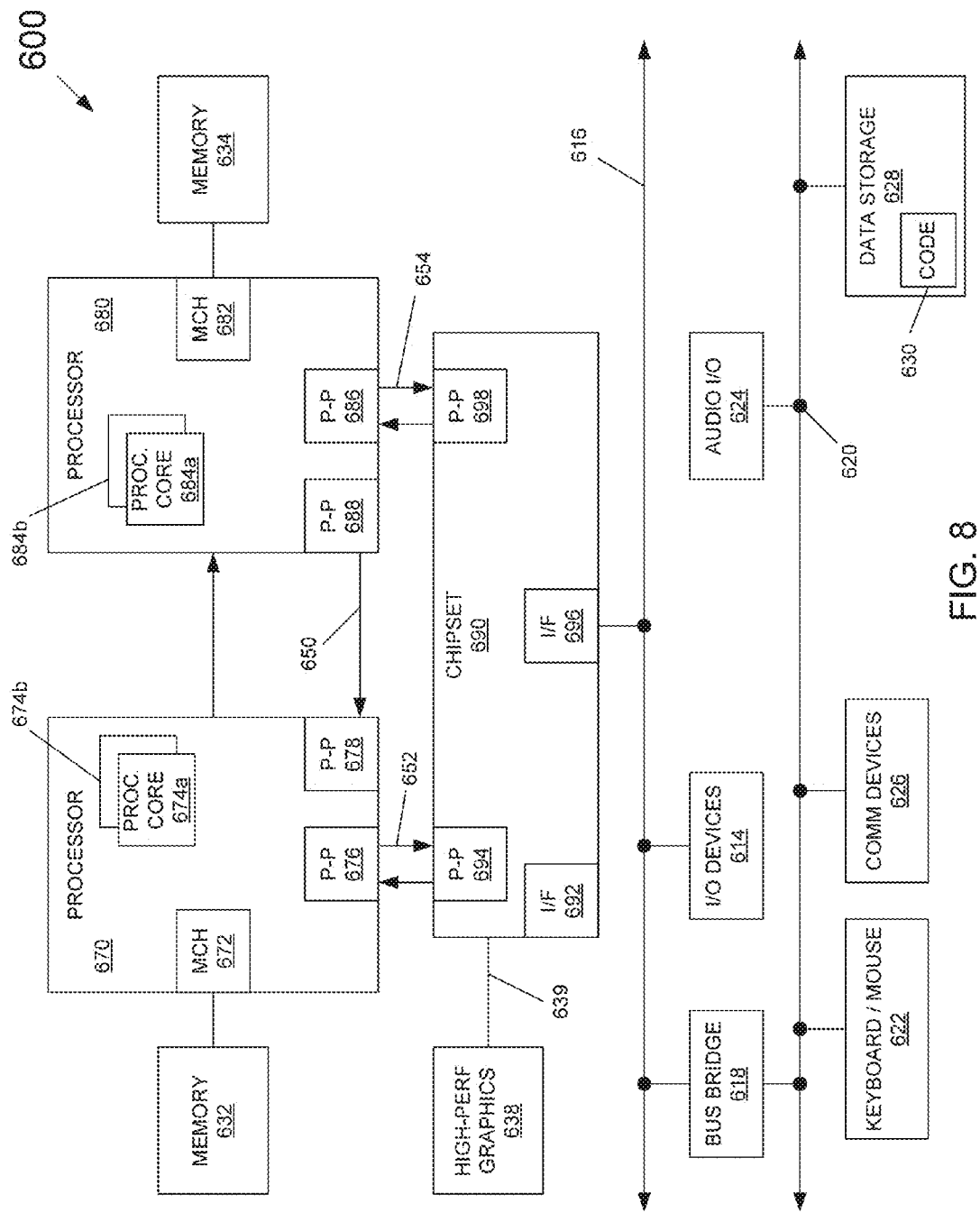
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include virtualization logic to enable multiple guests to access a memory mapped processor resource such as an APIC, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
an execution unit to execute instructions;
a hardware resource to be virtualized to enable a plurality of virtual machines to access the hardware resource in a time sliced manner; and
an access logic to determine, based at least in part on address information of a control register, whether an access request from a virtual machine is to a device access page of a memory associated with the hardware resource, and if so to re-map the access request to an offset in a virtual device page of the memory to enable a memory access operation to be performed at the offset in the virtual device page.

2. The processor of claim 1, further comprising the control register including a first indicator field to store a first permission indicator to indicate whether an emulated memory access to the device access page is to be allowed.

3. The processor of claim 2, wherein the first permission indicator comprises a read access permission indicator, the control register further comprising a second indicator field to store a second permission indicator to indicate whether an emulated write access to the device access page is allowed.

4. The processor of claim 3, wherein the control register further comprises a second address field to store a virtual device page address corresponding to an address of the virtual device page in the memory.

5. The processor of claim 1, wherein the hardware resource comprises a network controller.

6. The processor of claim 5, wherein the network controller comprises a memory mapped hardware structure.

7. The processor of claim 2, further comprising a microcode storage including an assist segment to program the control register responsive to the access request not matching an offset value corresponding to the address information in the control register.

8. The processor of claim 7, wherein the microcode storage further includes an initialization segment to store, upon entry into the virtual machine, a first value in a first address field of the control register and to store a first indicator value in the first indicator field to indicate that the emulated memory access to the device access page is allowed.

9. The processor of claim 7, further comprising a bit vector including a plurality of fields, each to indicate whether an offset within the device access page is valid.

10. The processor of claim 9, wherein the assist segment is to enable the processor to determine whether the access request is to a valid offset within the device access page based at least in part on the bit vector, and to cause an exit from the virtual machine if the access request is not to a valid offset.

11. The processor of claim 7, wherein the assist segment is to cause the processor to restart the access request from a front end unit of the processor, the front end unit including a non-inclusive instruction cache.

12. The processor of claim 1, wherein the processor comprises a plurality of cores, the hardware resource comprises an advanced programmable interrupt controller (APIC), and wherein the APIC is to be virtualized among the plurality of virtual machines to execute on at least some of the plurality of cores.

13. A non-transitory machine-readable medium having stored thereon instructions, which if performed by a machine cause the machine to perform a method comprising:
receiving, in a virtualization logic of a processor from a first virtual machine, a memory access request for an address in a system memory and determining if the address is within a device access page of a device of the processor;
if so, determining whether the memory access request is for a type having a valid permission indicator stored in a permission field of a control register of the processor and a portion of the address corresponds to an offset value stored in a first address field of the control register; and
if so, remapping the address to a virtual device page of the system memory associated with the first virtual machine.

14. The non-transitory machine-readable medium of claim 13, wherein the method further comprises remapping the address using an address of the virtual device page obtained from a second address field of the control register.

15. The non-transitory machine-readable medium of claim 14, wherein the method further comprises obtaining the virtual device page address from a virtual machine control structure for the first virtual machine, and storing the virtual device page address in the second address field.

16. The non-transitory machine-readable medium of claim 14, wherein the method further comprises obtaining and storing the virtual device page address using a virtualization initialization segment of a microcode of the processor.

17. The non-transitory machine-readable medium of claim 13, wherein the method further comprises, if the memory access request is not to a location within the device access page, causing an exit from the first virtual machine to a virtual machine monitor.

18. A system comprising:
a processor including a plurality of cores and an advanced programmable interrupt controller (APIC) to be virtualized among a plurality of virtual machines (VMs) to execute on the processor, one or more of the plurality of cores having a virtualization logic to determine whether an access request from a first virtual machine (VM) is to a device access page associated with the APIC and if so, to re-map the access request to a virtual device page in a system memory associated with the first VM; and
the system memory coupled to the processor.

19. The system of claim 18, further comprising a control register including a first indicator field to store a first permission indicator to indicate whether the access request is allowed, a first address field to store an offset value to identify a valid offset within the device access page, and a second address field to store a virtual device page address corresponding to an address of the virtual device page in the system memory.

20. The system of claim 19, further comprising:
a microcode storage including an assist segment to program the control register responsive to a portion of an address of the access request not matching the offset value; and
a bit vector including a plurality of fields, each to indicate whether an access request from a VM to an offset within the device access page is to be allowed.

* * * * *